(12) United States Patent
Carlotto

(10) Patent No.: US 7,101,480 B2
(45) Date of Patent: Sep. 5, 2006

(54) WATER TREATMENT APPARATUS

(76) Inventor: Franco Carlotto, Via Case Bianche, 107, Cittadella, Padova (IT) 35013

( * ) Notice: Subject to any disclaimer, the term of this patent is extended or adjusted under 35 U.S.C. 154(b) by 319 days.

(21) Appl. No.: 10/673,009

(22) Filed: Sep. 26, 2003

(65) Prior Publication Data

US 2005/0098491 A1 May 12, 2005

(30) Foreign Application Priority Data

Jan. 3, 2003 (IT) .......................... VI20030002 U

(51) Int. Cl.
*C02F 9/02* (2006.01)
*C02F 9/00* (2006.01)
*C02F 1/28* (2006.01)
*C02F 1/44* (2006.01)

(52) U.S. Cl. ................... 210/232; 210/266; 210/257.2; 210/295; 210/320; 210/321.6

(58) Field of Classification Search ................ 210/232, 210/266, 257.2, 295, 320, 321.6
See application file for complete search history.

(56) References Cited

U.S. PATENT DOCUMENTS

| | | | | |
|---|---|---|---|---|
| 4,476,015 A | * | 10/1984 | Schmitt et al. | ................ 210/93 |
| 5,002,664 A | * | 3/1991 | Clack et al. | ................. 210/251 |
| 5,143,601 A | * | 9/1992 | Slovak et al. | .................. 210/90 |
| 5,755,957 A | * | 5/1998 | Jeon | ............................ 210/86 |
| 6,080,313 A | * | 6/2000 | Kelada | ........................ 210/631 |
| 6,099,735 A | * | 8/2000 | Kelada | ........................ 210/652 |
| 6,312,589 B1 | * | 11/2001 | Jarocki et al. | ................ 210/87 |
| 6,370,884 B1 | * | 4/2002 | Kelada | ........................ 62/3.64 |

FOREIGN PATENT DOCUMENTS

| DE | 4108441 | * | 9/1992 |
|---|---|---|---|
| FR | 2 780 718 | | 1/2000 |

* cited by examiner

Primary Examiner—Thomas M. Lithgow
(74) Attorney, Agent, or Firm—R Neil Sudol; Henry D. Coleman; William J. Sapone

(57) ABSTRACT

A water treatment apparatus in which the various components that constitute the apparatus (prefilters, osmotic membrane filters, pump, et cetera) are contained in an enclosure. The enclosure includes a body provided with compartments that accommodate the components of the apparatus and at least one cap provided internally with channels for conveying the water in output from one compartment to the next. In this manner, the components of the apparatus are mutually connected without the need to use piping.

12 Claims, 6 Drawing Sheets

WATER TREATMENT APPARATUS

BACKGROUND OF THE INVENTION

1. Field of the Invention

The present invention relates to a water treatment apparatus.

2. Description of the Prior Art

Water supplied by the water mains, simply termed "tap water", often contains large quantities of dissolved substances that reduce its quality, accordingly making it scarcely suitable for domestic use.

This is true both when using the water to wash clothes and, most importantly, when the water is used for drinking, not to mention the fact that a high concentration of salts dissolved in the water produces limescale deposits in the piping, in the faucets and in the water circuits of many electrical household appliances (washing machines, irons, et cetera).

It is not uncommon to find, in mains water, traces of heavy metals and chlorine: the hardness of the water is very often higher than the optimum values and sometimes, mainly in large cities, there is a high concentration of polluting salts, such as nitrates, silicates and phosphates.

For all these reasons, very often home users prefer to equip themselves with water purifiers, which are used to restore the values of hardness, pH et cetera of the tap water to optimum levels.

The most effective and currently most widely used method for treating and demineralizing tap water is certainly the use of a reverse-osmosis apparatus.

A reverse-osmosis purifier is a device essentially constituted by one or more semipermeable membrane filters and one or more prefilters (of the mechanical and/or activated-carbon type).

The purifier, connected to the home water mains, is capable of producing water that is almost entirely free from dissolved substances.

The pressurized tap water is first passed through the prefilters; the activated-carbon filter in practice acts as a dechlorinating agent; the mechanical filter, which can be installed before or after the activated carbon, is substantially constituted by a cartridge of wound cotton thread and is designed to retain the larger impurities (up to 5 microns) that might end up in the semipermeable membrane and block it (for example the particles of the activated carbon itself).

The prefiltered water is then conveyed, usually propelled by a pump, into the osmotic-membrane filters, which eliminate 80 to 98% of all other substances (salts, ions of heavy metals, organic compounds, but also any pesticides, bacteria, et cetera).

In output there are two types of water: the demineralized water, known as permeate, which is meant for users, and the waste water, termed concentrate, which is rich in extracted substances and can instead be eliminated.

The quality and quantity of water produced is determined by various factors, first of all by the size and type of membrane.

There are mainly two types of membrane: CTA (cellulose acetate) membranes, which are cheaper but short-lived because they can be attacked easily by the bacteria that settle especially during periods of inactivity, and TFC (Thin Film Composite) (aromatic polyamide) membranes, which are slightly more expensive but absolutely more reliable.

In conventional systems, the various components of the purifier (membrane filters, prefilters, pump, et cetera) consist of independent modules that are mutually connected by means of pipes, elbows, unions, et cetera.

The presence of these last parts entails drawbacks, the main of which is linked to the leaks that can occur at the joints of the piping.

Another drawback of conventional purifiers is that they are bulky.

The aim of the present invention is to provide an apparatus that overcomes the drawbacks of the cited prior art.

An object of the invention is to provide a water treatment apparatus in which the various components of the apparatus are mutually connected without using pipes, conduits, et cetera, minimizing the risk of leaks.

A further object of the invention is to provide a water purifier that is modular, miniaturized, extremely compact and not bulky.

A further object of the invention is to provide a purifier that integrates multiple functions simultaneously (carbonation, refrigeration, syruping).

SUMMARY OF THE INVENTION

This aim and these and other objects that will become better apparent hereinafter are achieved by a water treatment apparatus as claimed in the appended claims.

Further characteristics and advantages will become better apparent from the description of a water treatment apparatus according to the invention, illustrated by way of non-limitative example in the accompanying drawings.

DESCRIPTION OF THE PREFERRED EMBODIMENTS

Figure 1:
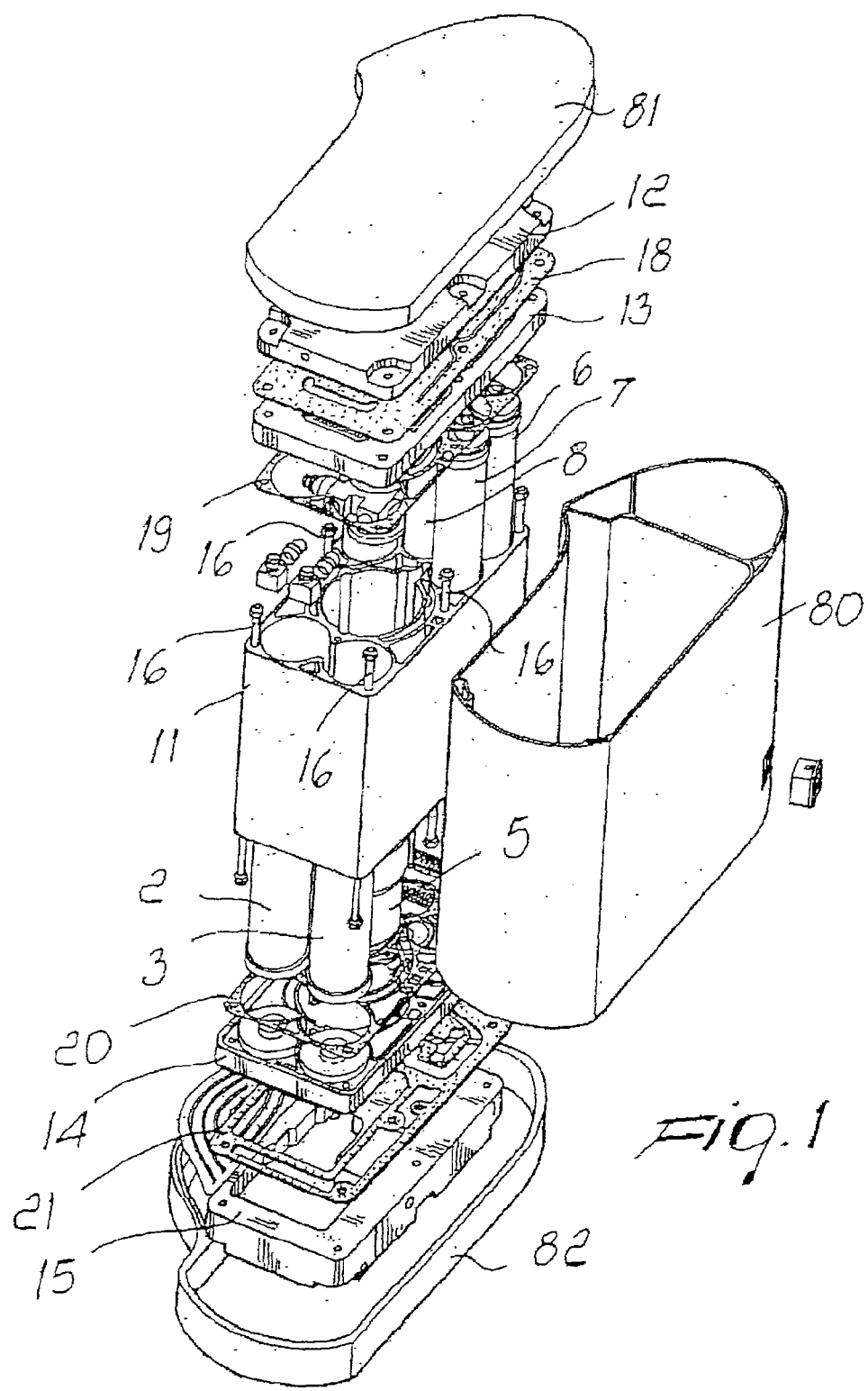
FIG. 1 is an exploded perspective view of an apparatus according to the invention.

With reference to FIG. 1, a water treatment apparatus according to the invention, generally designated by the reference numeral 1, comprises an enclosure 10, which is constituted by a casing 11, made for example by extrusion, and by four closure plates, designated by the reference numerals 12, 13, 14 and 15 respectively.

The components of the apparatus are accommodated within the enclosure 10 and include the purifying means which can be of a per se known type.

The enclosure 10 is accommodated in a container 80, which is enclosed by two shells 81 and 82.

The purifying means comprises two activated-carbon (and/or sediment-type) filters 2 and 3, an assembly constituted by a pump 4 and an electric motor 5, and three membrane filters 6, 7 and 8 of the TFC type.

A feature of the present invention is that the casing 11 of the enclosure 10 is provided with compartments for accommodating the above listed purifying means (and other means described hereinafter), while hydraulic connection between one component and the next is ensured by a plurality of channels provided within the material of the closure plates.

Figure 2:
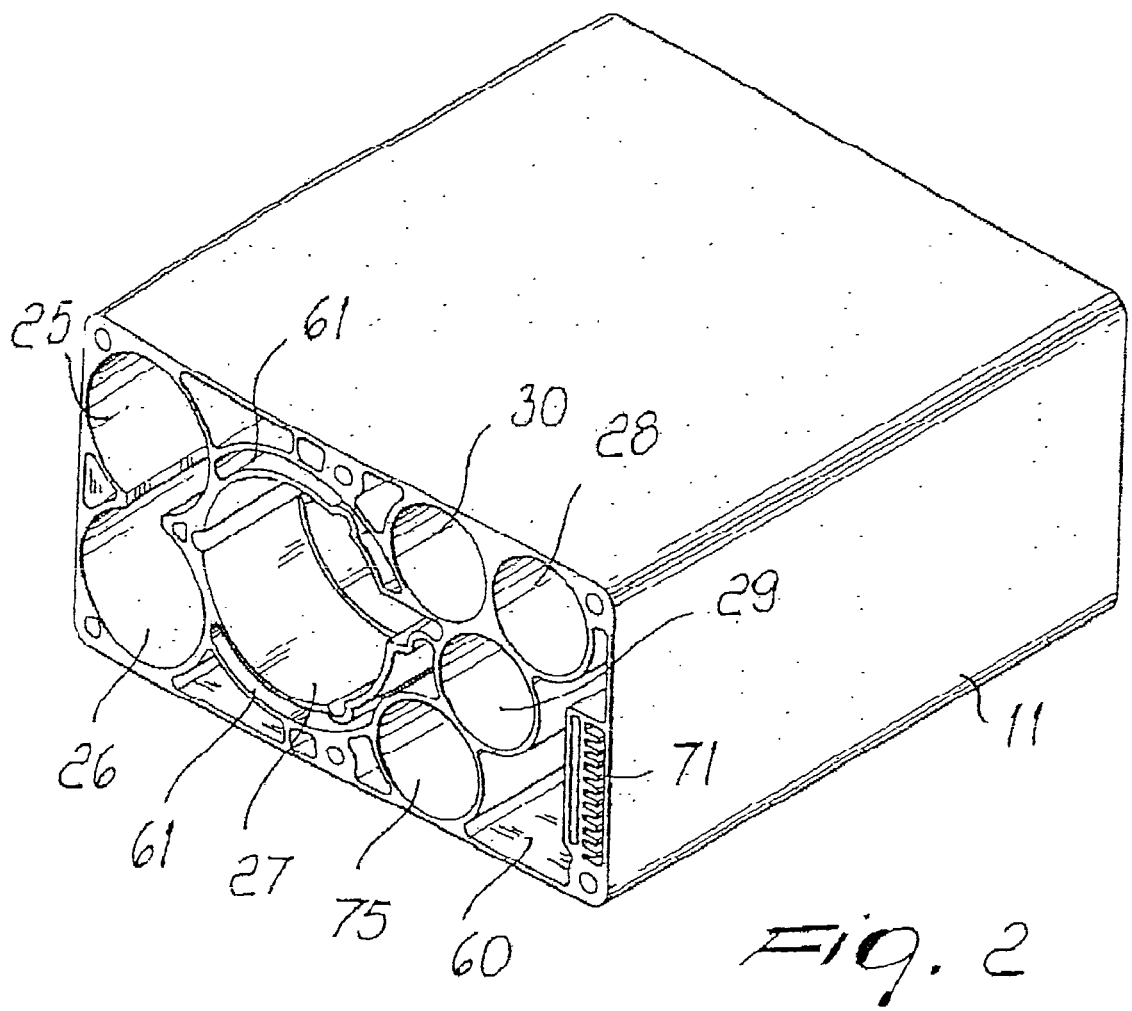
FIG. 2 is a perspective view of the casing.
Figure 3:
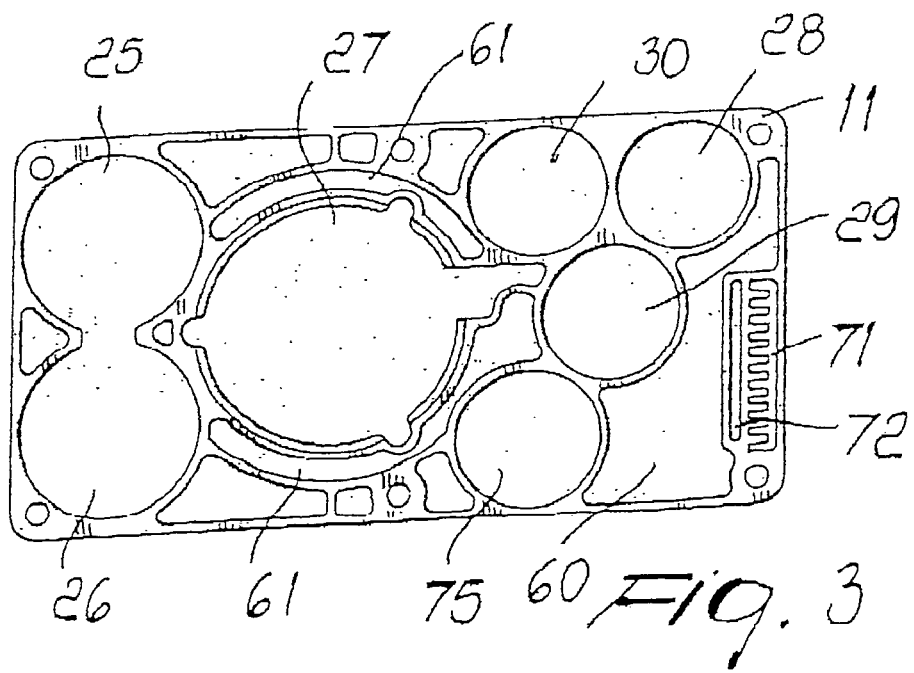
FIG. 3 is a plan view of the casing.

In this regard, FIGS. 2 and 3 show the compartments for accommodating the components of the apparatus, which are provided within the body of the casing 11, and particularly the compartments 25 and 26, which accommodate the carbon filters 2 and 3, the compartment 27, which accommodates the assembly constituted by the pump 4 and the electric motor 5, and the three compartments 28, 29 and 30, which are meant for the membrane filters 6, 7 and 8.

Before proceeding with the description of the hydraulic connections among the various components of the apparatus, it should be noted, particulary in FIG. 1, that the closure plates 12, 13, 14 and 15, hereinafter referenced respectively as top cap 12, top cap liner 13, bottom cap liner 14 and bottom cap 15, are detachably fixed at the open ends of the casing 11 by six bars 16, which are threaded at their ends and are locked by twelve nuts, six for each side.

The seal of the entire block is ensured by four gaskets 18, 19, 20 and 21, that are arranged respectively so that the first gasket 18 lies between the top cap 12 and the top cap liner 13, the second gasket 19 lies between the top cap liner 13 and the casing 11, the third gasket 20 lies between the casing 11 and the bottom cap liner 14, and finally the last gasket 21 lies between the bottom cap liner 14 and the bottom cap 15.

The connections of the hydraulic circuit are ensured by the system of channels provided within the enclosure 10 and particularly within the body of the plates 12, 13, 14 and 15. As visible in FIG. 9, an inlet duct 31 is provided within the body of the bottom cap 15 and is connected to the main water supply source to be treated.

The inlet duct 31 is connected, by a hole 32, to an electric valve 32c, which is accommodated in a recess 33, which is formed partially within the material of the bottom cap 15 and for the remaining part within the material of the bottom cap liner 14.

The recess 33 is connected to the cylindrical compartments 25 and 26 of the casing 11, where the carbon filters 2 and 3 are accommodated, through a through hole 34 that is provided in the bottom cap liner 14.

The compartments 25 and 26 of the carbon filters are connected in an upper region to an intake duct 35 of the pump 4, which is accommodated, together with the electric motor 5, in the compartment 27.

Such connection is provided by two holes 36 and 37 and a passage 38, which are provided in the top cap liner 13 and from there by a hole 39 and a manifold 40 provided in the top cap 12.

A delivery duct 41 of the pump 4 is connected to the membrane filters by a second manifold 42 and a hole 43 provided in the top cap 12 and from there through a channel 44 formed in the top cap liner 13.

The channel 44 ends, through holes 45, 46 and 47, in the receptacles 28, 29 and 30 of the casing 11, which are preset to accommodate the membrane filters 6, 7 and 8. Two types of water are obtained at the discharge of the membrane filters: the purified water, known as permeate, whose path is indicated hereinafter with progressive numerals followed by the letter "a", and the waste water, known as concentrate, whose path is indicated hereinafter by way of progressive numerals followed by the letter "b".

Figure 7:
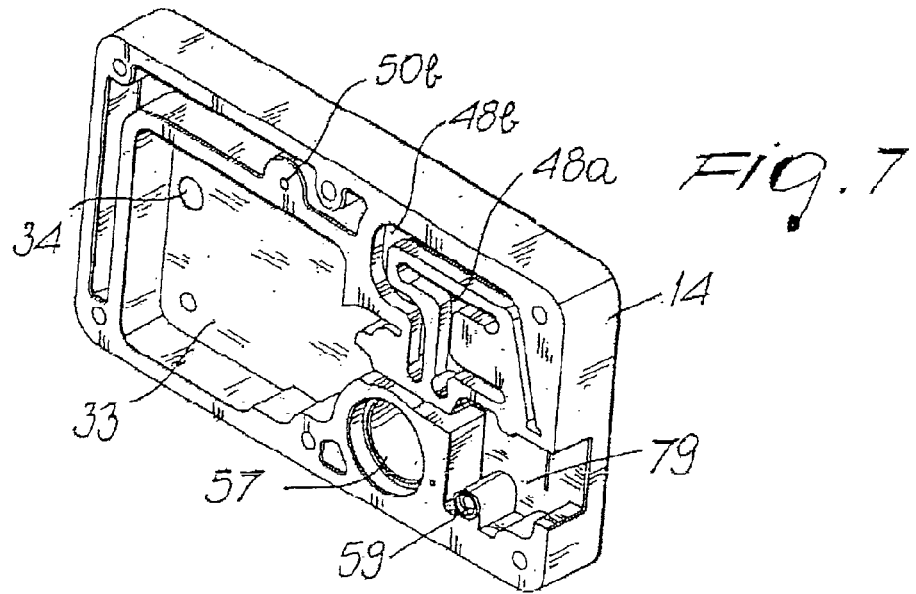
FIG. 7 is a perspective view of the bottom cap liner.
Figure 8:
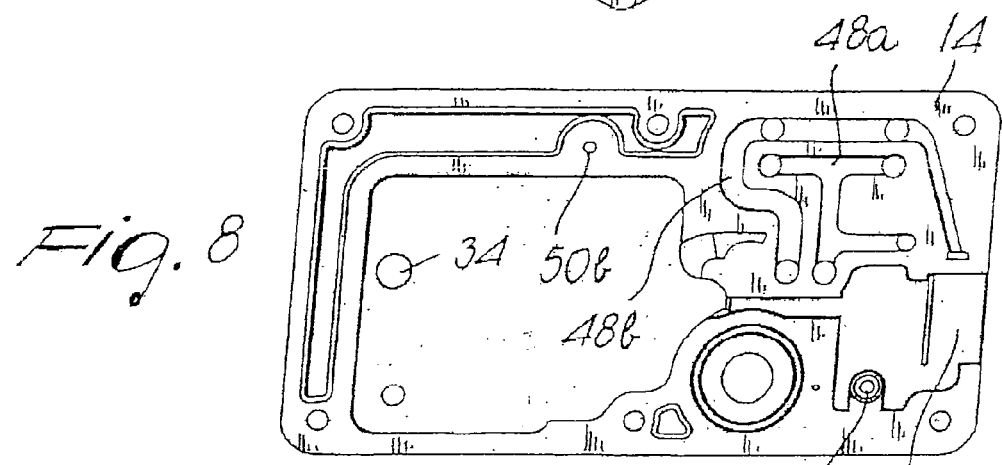
FIG. 8 is a bottom plan view of the bottom cap liner.

As regards the permeate, the output of the membrane filters is connected to a first tank 60 (FIGS. 2 and 3) via a multiple channel 48a formed in the bottom cap liner 14 (FIGS. 7 and 8). The permeate tank 60 is formed directly within the mass of the casing 11, occupying the volume of one of its compartments.

Figure 4:
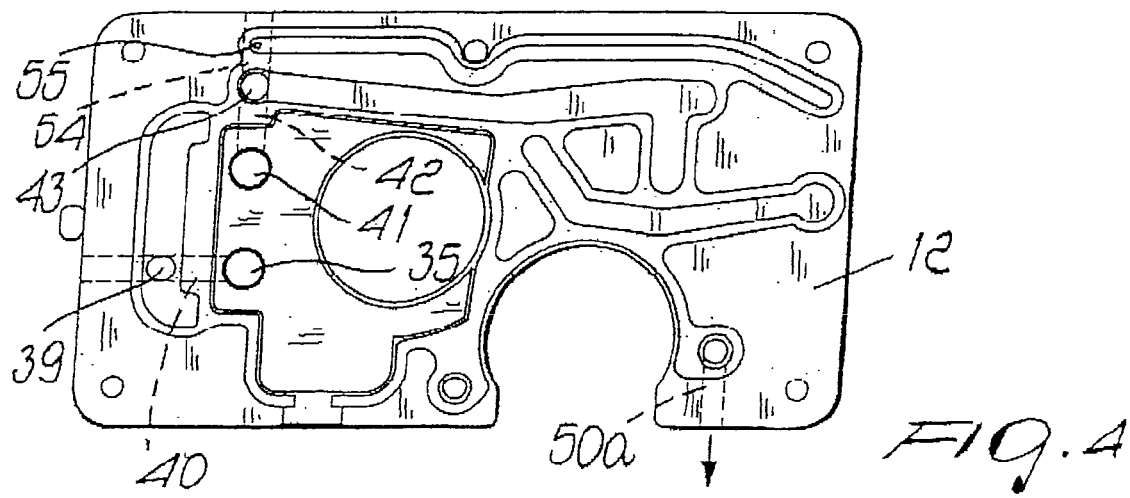
FIG. 4 is a bottom plan view of the top cap.
Figure 5:
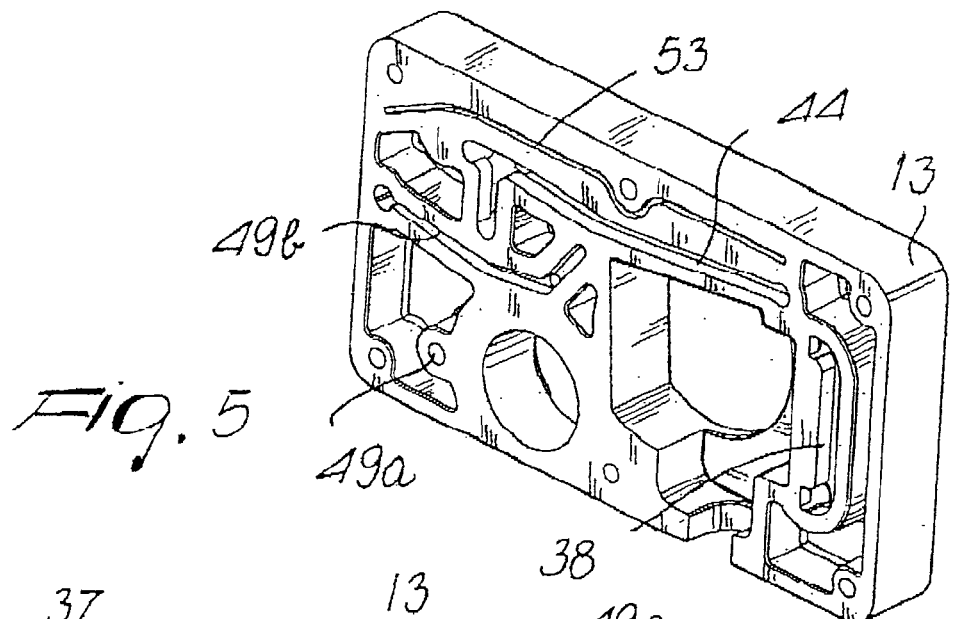
FIG. 5 is a perspective view of the top cap liner.

From the tank 60, the permeate finally reaches the users, because the tank 60 is connected to the outside through an opening 49a provided in the top cap liner 13 (FIG. 6) and then through a L-shaped duct 50a provided in the top cap 12 (FIGS. 4 and 5).

The tank 60 is adjacent to a chamber 72 (FIGS. 2 and 3) that accommodates a Peltier cells provided in order to cool the permeate.

As regards the concentrate, instead, the output of the membrane filters is collected in the slot 48b (FIGS. 7 and 8), which leads into the compartment 71 arranged adjacent to the chamber 72 (FIGS. 2 and 3).

In this regard, the compartment 71 has a finned internal surface so as to improve heat dissipation from the Peltier cells.

The Peltier cells in fact cool the permeate contained in the tank 60, removing its excess heat and transferring it to the concentrate as it flows in the compartment 71.

Figure 6:
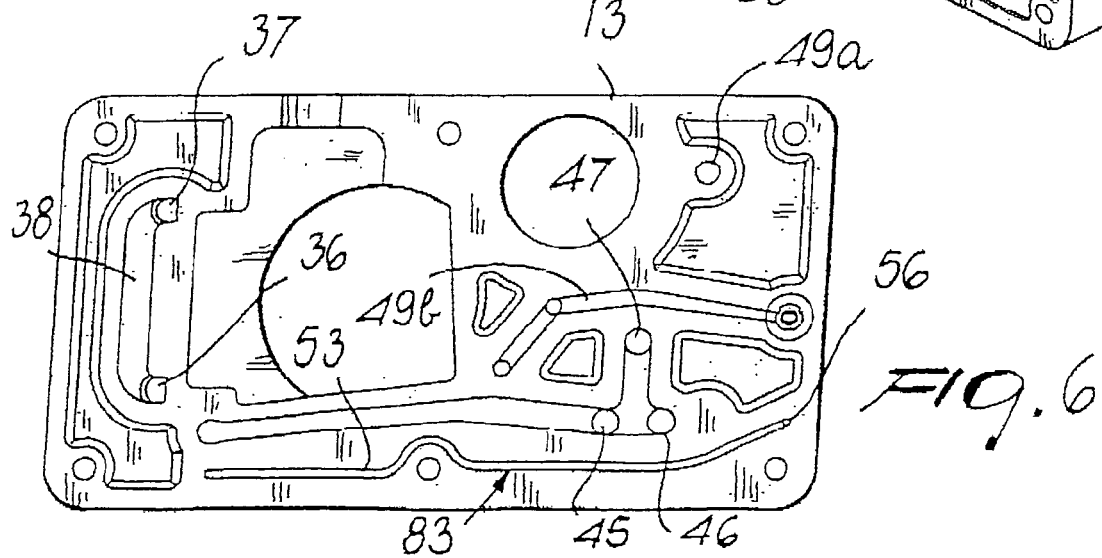
FIG. 6 is a top plan view of the top cap liner.

The output of the compartment 71 is connected to a second tank 61 for the concentrate (FIGS. 2 and 3) by the slot 49b provided in the top cap liner 12 (FIG. 6).

As can be seen in FIGS. 2 and 3, the tank 61, like the tank 60, is provided within the material of the casing 11, occupying one of its compartments. The tank 61 consists in practice of a cylindrical jacket that surrounds the pump-electric motor assembly.

Finally, the tank 61 is connected to the outside via the opening 50b provided in the bottom cap liner 14 (FIGS. 7 and 8) and then through another L-shaped channel 51b provided in the bottom cap 15 (FIG. 9), allowing discharge of the concentrate.

There is also a bypass 83, which allows to transfer liquid in output from the pump 4 (not yet treated in the membrane filters) directly to the permeate tank 60 in order to adjust its salinity.

The bypass 83 includes the channel 53 provided in the top cap liner 13 (FIGS. 5 and 6), which is connected on one side to the delivery duct 41 of the pump through the manifold portion 54 and the opening 55 (FIG. 4) and on the other side to the tank 60 through the small hole 56 (FIGS. 5 and 6).

Finally, the apparatus includes a carbonation device 77, which is connected to a bottle of $CO_2$ 76 that is accommodated in the compartment 75 of the casing 11. The carbonation device 77 is partially accommodated within the compartment 75, and the remaining part thereof is accommodated in the circular chamber 57 formed within the materials of the bottom cap liner 14 and of the bottom cap 15 (FIGS. 7, 8 and 9).

The chamber 57 is then connected to the permeate tank 60 through the duct 58 (FIG. 9) and then through the hole 59 that leads into the tank 60.

Figure 9:
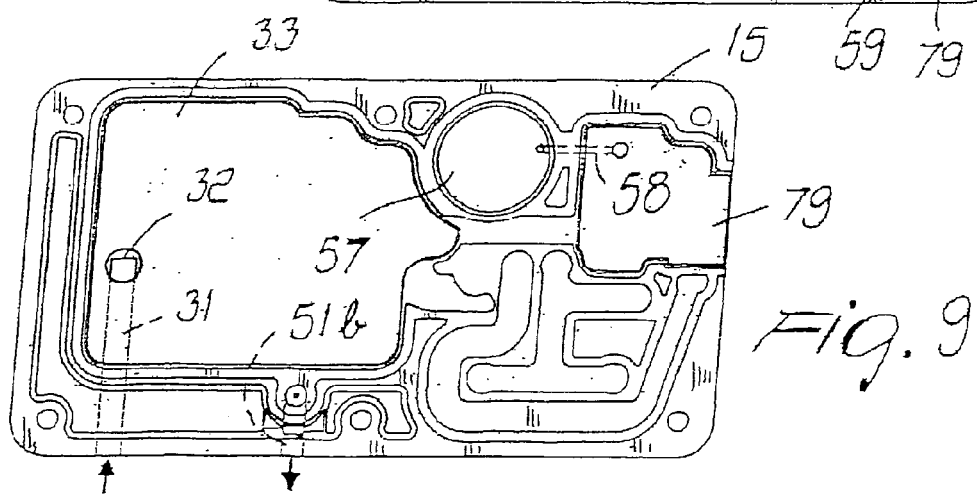
FIG. 9 is a top plan view of the bottom cap liner.

An electric valve 78, for $CO_2$ adjustment, is interposed between the output of the duct 58 and the hole 59 and is accommodated in the receptacle 79 formed partly within the bottom cap liner 14 and partly within the bottom cap 15 (FIGS. 7, 8 and 9).

Figure 10:
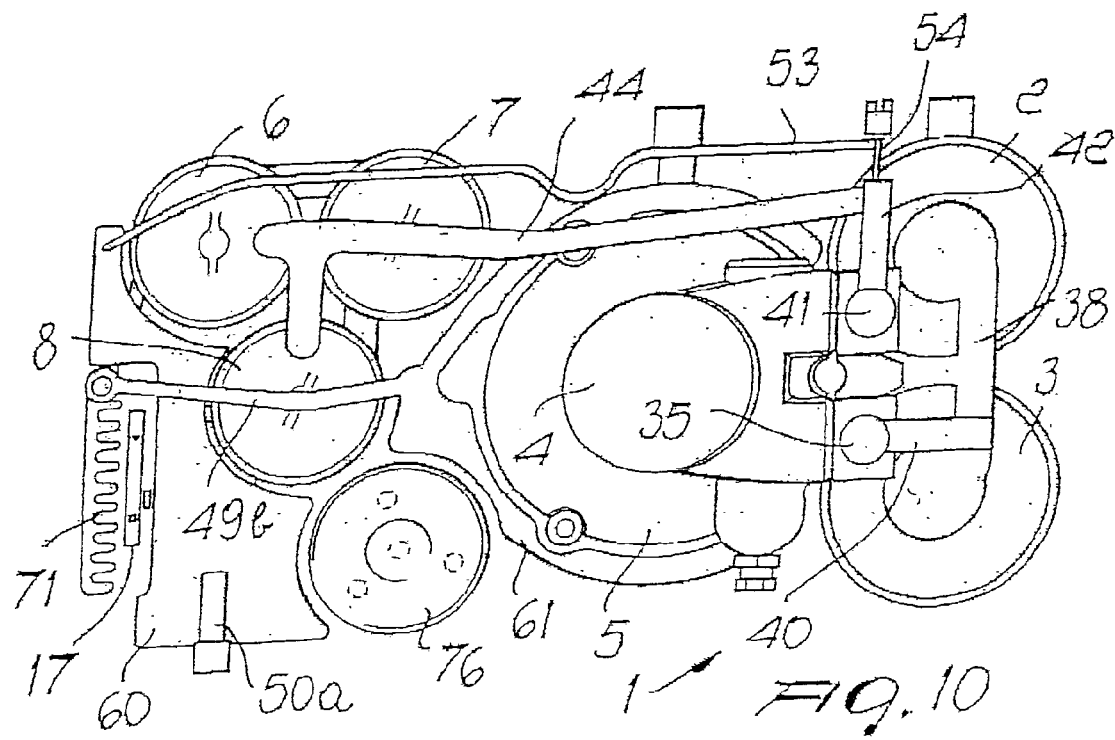
FIG. 10 is a top view of the components of the apparatus with their connections.
Figure 11:
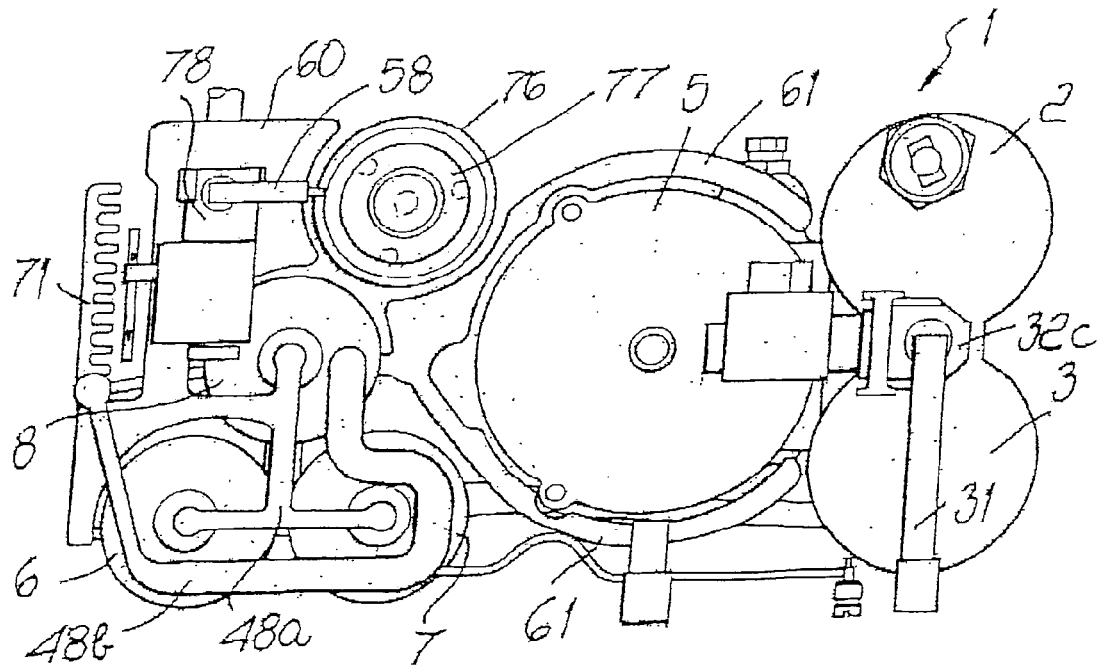
FIG. 11 is a bottom view of the components of the apparatus with their connections.
Figure 12:
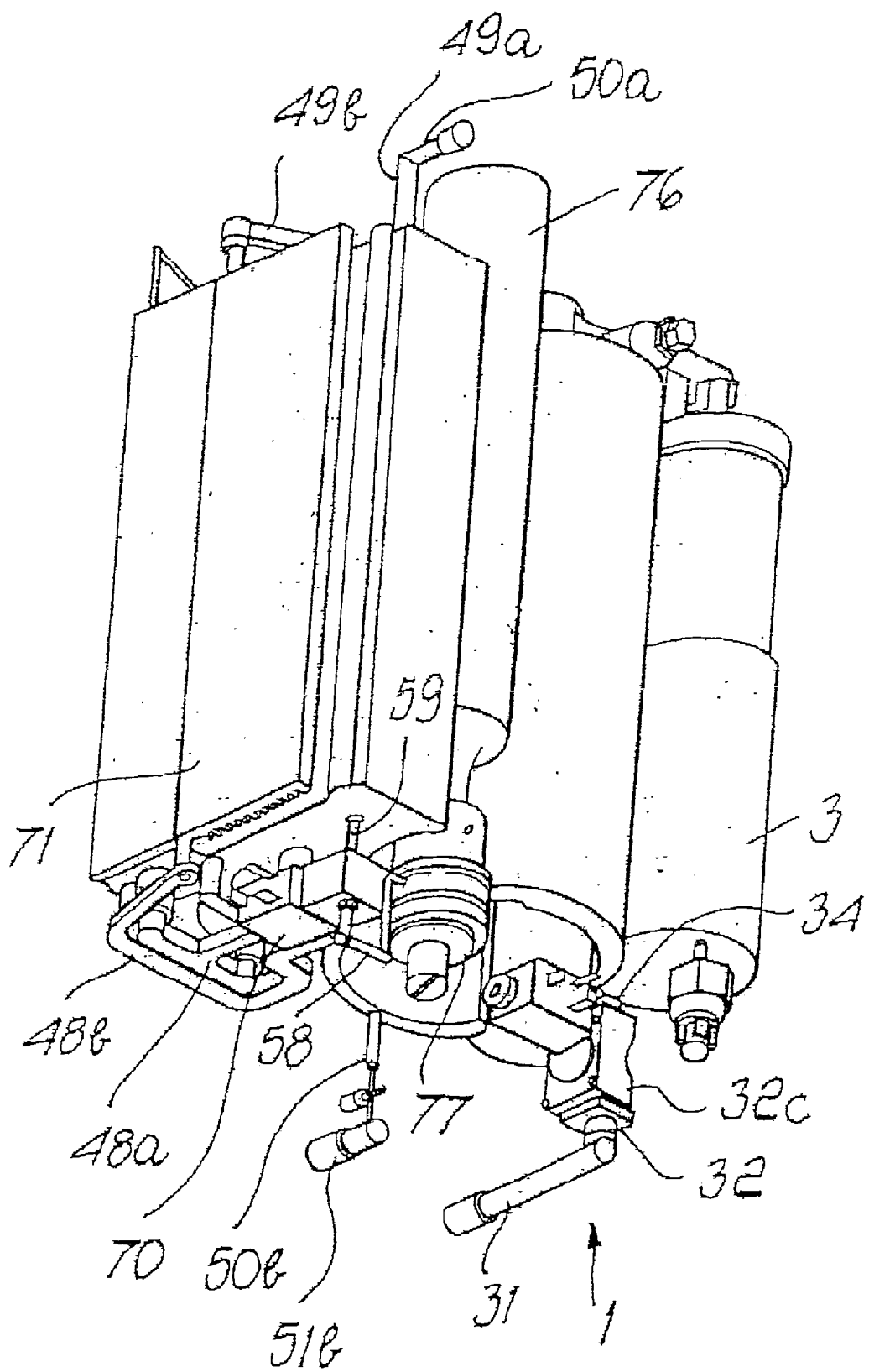
FIG. 12 is a perspective view of the components of the apparatus with their connections.

It should be noted that the path followed by the liquid, which flows in the hydraulic circuit of the apparatus by passing from one module to the next through the channel system described above, is clearly evident from FIGS. 10, 11 and 12, which illustrate the purifying system, abstracting therefrom the casing 11 and the closure plates 12, 13, 14 and 15. In viewing these figures, one should therefore bear in mind that the various modules are accommodated in the compartments of the casing 11 and that every hydraulic connection is actually provided by way of one or more channels and/or holes formed within the plates 12, 13, 14 and 15, as described above.

The operation of the apparatus according to the invention is substantially the same as that of a conventional apparatus, except for the fact that the water is not transferred from one module to the next by means of pipes and conduits but rather by flowing through the described system of compartments and channels and holes formed in the very body of the enclosure, which contains all the components of the apparatus.

The "tap water" to be treated that arrives from the water mains is first of all prefiltered in the activated-carbon filters 2 and 3 and from there is introduced, by the pump 4, in the membrane filters 6, 7 and 8. The permeate in output from the membrane filters is then collected in the tank 60, ready to be distributed to users.

Optionally, the purified water can be carbonated by introducing $CO_2$ dispensed by the carbonation device 77 in the tank 60.

The salinity of the permeate is kept under control, within the values set by the standards, by the controlled introduction, in the tank 60, of water that has been prefiltered (but not treated further in the membrane filters), drawing the water directly from the delivery duct 41 of the pump 4 via the bypass 83.

The concentrate in output from the membrane filters is instead first introduced in the tank 61 and then discharged externally.

The capacity of the apparatus depends substantially on the operating pressure and on the number and size of the components, primarily of the membrane filters and of the prefilters.

The structure of the apparatus according to the invention is such that it facilitates maintenance operations considerably: if it is necessary to replace a filter or any other component, it is sufficient to remove the covers, extract the component to be replaced from its compartment, and then replace it with another equivalent one.

Further, the number of components and of corresponding compartments can be changed according to the requirements and according to the required capacity, and it is possible for example to provide additional modules in addition to the ones described.

For example, it is possible to provide an additional compartment for accommodating a syruping device that contains a syrup of any kind which, mixed with the permeate, allows to obtain beverages of various kinds, such as fruit juices, orangeades, et cetera.

Accordingly, the hydraulic circuit also can be modified, both as a consequence of a modification of the layout of the machine and as a consequence of the integration of new functions such as addition of automatic flows in order to prevent membrane inactivity, recovery of the concentrate from a membrane in order to reduce the amount of waste, et cetera.

The described apparatus can be connected to the water mains and simply installed as an undersink purifying unit under the sink or can be provided with a faucet for distributing the permeate.

In practice it has been found that the invention achieves the intended aim and objects.

The materials and the dimensions may of course vary according to requirements and to the state of the art.

The invention claimed is:

1. A water treatment apparatus provided with a purifying means that comprises a filtration means and a pump-electric motor assembly, said apparatus comprising an enclosure that is provided internally with compartments for accommodating said purifying means, said enclosure being provided with a system of channels and holes, formed within its material, for conveying water from one compartment to the next, said enclosure comprising an open body and of at least one plate for closing said body, said body being provided with said compartments for accommodating said purifying means, said at least one closure plate being connected detachably to an open end of the body and being provided internally with said system of channels and holes, said at least one closure plate being one of four closure plates provided with channels and including a bottom cap, a bottom cap liner, a top cap and a top cap liner.

2. The apparatus according to claim 1, wherein said bottom cap is connected to said bottom cap liner and the assembly constituted thereby is connected to a first open end of said body, while said top cap is connected to said top cap liner and the assembly constituted thereby is connected to a second open end of said body.

3. The apparatus according to claim 2, wherein gaskets are respectively interposed between said top cap and said top cap liner, said top cap liner and said body, said body and said bottom cap liner, and said bottom cap liner and said bottom cap.

4. The apparatus according to claim 3, further comprising connection means for fixing said plates to each other and to said body, with said gaskets interposed.

5. The apparatus according to claim 1, wherein said filtration means comprises a prefiltering assembly of an activated-carbon type and a main membrane-type filtration assembly.

6. The apparatus according to claim 1, further comprising a first tank for collecting purified water and a second tank for collecting waste water before a discharging of the waste water.

7. The apparatus according to claim 6, wherein said first and second tanks are formed in a corresponding number of compartments of said body.

8. The apparatus according to claim 1, further comprising at least one water cooling module.

9. The apparatus according to claim 8, wherein said cooling module consists of at least one Peltier cell.

10. The apparatus according to claim 8, further comprising a carbonation device that is connected to a bottle of $CO_2$ in order to carbonate the water.

11. The apparatus according to claim 10, wherein said carbonation device, said bottle of $CO_2$ and said water cooling module are accommodated in a corresponding number of additional compartments formed within said body.

12. A water treatment apparatus provided with a purifying means that comprises a filtration means and a pump-electric motor assembly, said apparatus comprising an enclosure that is provided internally with compartments for accommodating said purifying means, said enclosure being provided with a system of channels and holes, formed within its material, for conveying water from one compartment to the next, said apparatus further comprising a carbonation device that is connected to a bottle of $CO_2$ in order to carbonate the water, said carbonation device and said bottle of $CO_2$ being accommodated in a corresponding number of additional compartments formed within said enclosure.

* * * * *